(12) United States Patent
Lee et al.

(10) Patent No.: US 11,359,096 B2
(45) Date of Patent: Jun. 14, 2022

(54) NIR FLUORESCENT PROBE FOR LABELING MITOCHONDRIA

(71) Applicant: KOREA INSTITUTE OF SCIENCE AND TECHNOLOGY, Seoul (KR)

(72) Inventors: Jun-Seok Lee, Seoul (KR); Dhiraj P. Murale, Seoul (KR); Seong-Cheol Hong, Seoul (KR); Kyung-Tae Hong, Seoul (KR); Yun-Kyung Kim, Seoul (KR); Seok Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 550 days.

(21) Appl. No.: 16/403,041

(22) Filed: May 3, 2019

(65) Prior Publication Data
US 2020/0040190 A1     Feb. 6, 2020

(30) Foreign Application Priority Data

Aug. 2, 2018 (KR) .................. 10-2018-0090484

(51) Int. Cl.
C09B 23/04 (2006.01)
G01N 21/64 (2006.01)
C07F 5/02 (2006.01)

(52) U.S. Cl.
CPC ............. C09B 23/04 (2013.01); C07F 5/027 (2013.01); G01N 21/6428 (2013.01); G01N 2021/6439 (2013.01)

(58) Field of Classification Search
None
See application file for complete search history.

(56) References Cited

FOREIGN PATENT DOCUMENTS

KR    10-2009-0119283 A    11/2009

*Primary Examiner* — Joseph R Kosack
(74) *Attorney, Agent, or Firm* — Goldilocks Zone IP Law

(57) ABSTRACT

Disclosed is a fluorescent probe specifically labeling mitochondria, which can exhibit high transmittance by virtue of light emission in the NIR range and in which nonspecific fluorescence absorption in biomolecules can be avoided, making it possible to observe fluorescence images in deep tissue.

8 Claims, 2 Drawing Sheets
(1 of 2 Drawing Sheet(s) Filed in Color)

NIR FLUORESCENT PROBE FOR LABELING MITOCHONDRIA

CROSS REFERENCE TO RELATED APPLICATION

The present application claims the benefit of Korean Patent Application No. 10-2018-0090484 filed on Aug. 2, 2018.

BACKGROUND OF THE INVENTION

1. Technical Field

The present invention relates to a near-infrared (NIR) florescent probe for labeling mitochondria.

2. Description of the Related Art

Cell-organelle-based proteomics enables the diagnosis and treatment of disease by determining and controlling an increase or decrease in the intracellular concentration of proteins residing in target organelles using the mechanisms of the proteins through stimulation thereof. In particular, mitochondria are intracellular organelles that are responsible for energy metabolism, biosynthesis, signaling, etc. and are essentially involved in carcinogenesis, and thorough research thereon with the goal of developing anticancer therapies is ongoing. The method commonly used for the labeling of an intracellular organelle, the labeling of a certain protein (toxic substance) or the like is a method of transfection of a green fluorescence protein (GFP) using a virus, as in the following patent literature.

PATENT LITERATURE

Korean Patent Application Publication No. 10-2009-0119283 (Laid-open date: Nov. 19, 2009), entitled "Development of protein over-expression system using green fluorescence protein"

However, the conventional transfection method is problematic because the protein size is large and only the spatial vicinity of a protein whose genetic information is known may be treated. Accordingly, methods of labeling a target protein with a fluorescent dye injected from the outside have been extensively studied. However, in the conventional methods of labeling mitochondria using fluorescent dye, since the fluorescent dye emits light in the visible light range, transmittance is lowered and it is difficult to avoid nonspecific fluorescence absorption in biomolecules.

SUMMARY OF THE INVENTION

Accordingly, the present invention has been made keeping in mind the problems encountered in the related art, and an objective of the present invention is to provide a fluorescent probe specifically labeling mitochondria.

Another objective of the present invention is to provide a fluorescent probe, which may exhibit high transmittance by virtue of light emission in the NIR range and in which nonspecific fluorescence absorption in biomolecules may be avoided, making it possible to observe fluorescence images in deep tissue.

In order to accomplish the above objectives, the present invention is implemented by the following embodiments.

An embodiment of the present invention provides a compound represented by Chemical Formula 1 below.

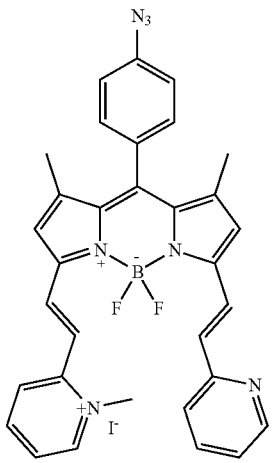

[Chemical Formula 1]

Also, in the embodiment of the present invention, the compound according to the present invention may be used to label mitochondria.

Also, in the embodiment of the present invention, the compound according to the present invention may generate a red fluorescence.

Another embodiment of the present invention provides a fluorescent probe for labeling mitochondria, represented by Chemical Formula 1 below.

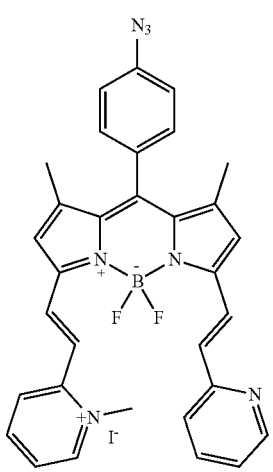

[Chemical Formula 1]

Also, in the embodiment of the present invention, the fluorescent probe for labeling mitochondria according to the present invention may generate a red fluorescence.

Still another embodiment of the present invention provides a method of detecting mitochondria using the aforementioned compound represented by Chemical Formula 1.

Also, in the embodiment of the present invention, the method of detecting mitochondria according to the present invention may comprise preparing a solution by dissolving the compound represented by Chemical Formula 1 in a solvent and adding the solution to a sample including cells.

Also, in the embodiment of the present invention, the method of detecting mitochondria according to the present invention may further comprise applying light at a predetermined wavelength to the sample added with the compound represented by Chemical Formula 1 and measuring the fluorescence emitted from the sample.

Yet another embodiment of the present invention provides a method of preparing a compound for labeling mitochondria, the method comprising forming a compound represented by Chemical Formula 1 below by reacting a compound represented by Chemical Formula 4 below, acetonitrile, and methyl iodide.

[Chemical Formula 1]

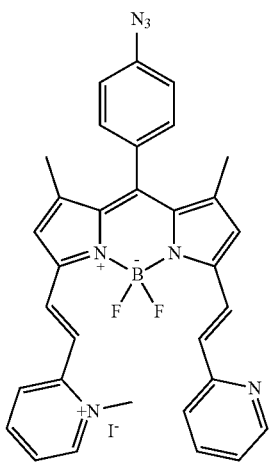

[Chemical Formula 4]

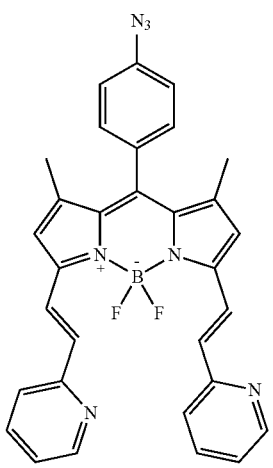

Also, in the method of preparing the compound for labeling mitochondria according to the embodiment of the present invention, the compound represented by Chemical Formula 4 may be formed by dissolving a compound represented by Chemical Formula 3 below, 2-pyridine carbaldehyde, pyrrolidine and acetic acid in acetonitrile and carrying out a reaction with addition of a molecular sieve.

[Chemical Formula 3]

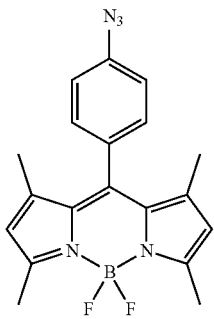

Also, in the method of preparing the compound for labeling mitochondria according to the embodiment of the present invention, the compound represented by Chemical Formula 3 may be formed by reacting a compound represented by Chemical Formula 2 below, hydrazine and Pd/C in ethanol, removing Pd/C through celite, performing purification to give a powder, dissolving the powder in a mixed solution of hydrochloric acid and methanol, carrying out a reaction with addition of a sodium nitrite solution, and carrying out a reaction with addition of a sodium azide solution.

[Chemical Formula 2]

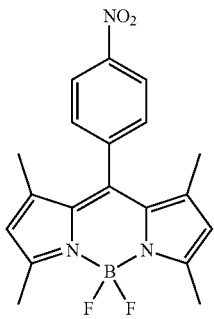

Also, in the method of preparing the compound for labeling mitochondria according to the embodiment of the present invention, the compound represented by Chemical Formula 2 may be formed by dissolving 2,4-dimethylpyrrole and 4-nitrobenzaldehyde in dichloromethane, carrying out a reaction with addition of trifluoroacetic acid, carrying out a reaction with addition of 2,3-dichloro-5,6-dicyano-1,4-benzoquinone dissolved in dichloromethane, carrying out a reaction with addition of diisopropylethylamine, and carrying out a reaction with addition of boron trifluoride etherate.

Also in the method of preparing the compound for labeling mitochondria according to the embodiment of the present invention, the compound represented by Chemical Formula 1 may generate a red fluorescence.

The embodiments of the present invention are capable of exhibiting the following effects.

According to the present invention, mitochondria can be specifically labeled using a newly synthesized compound.

Also, the compound of the present invention is capable of emitting light in the NIR range, thus manifesting high transmittance, and of avoiding nonspecific fluorescence absorption in biomolecules, making it possible to observe fluorescence images in deep tissue.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF SPECIFIC EMBODIMENTS

Figure 1:
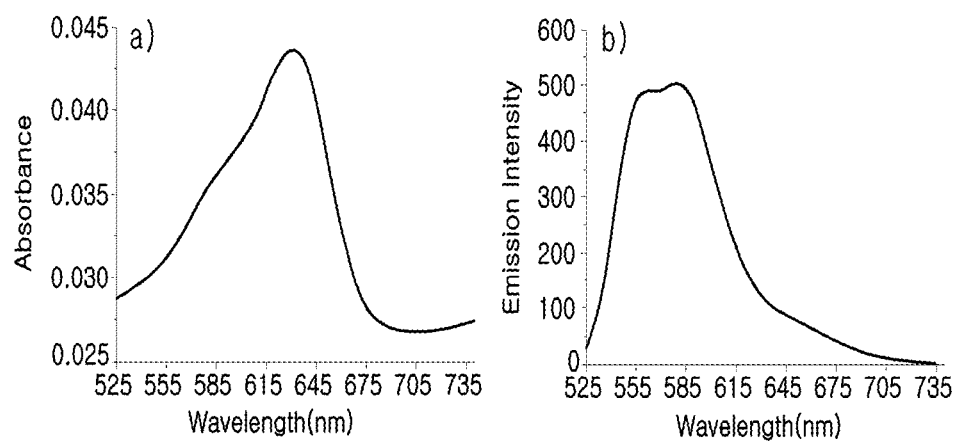
FIG. 1 show the absorption spectrum and the emission spectrum of a compound according to an embodiment of the present invention.

Hereinafter, a detailed description will be given of an NIR fluorescent probe for labeling mitochondria according to the present invention with reference to the drawings. Unless otherwise defined, all terms used herein have the same meanings as those commonly understood by one of ordinary skill in the art to which the present invention belongs. In the case where the meanings thereof conflict, the description including the definitions herein shall prevail. Furthermore, descriptions of known techniques, even if they are pertinent to the present invention, are considered unnecessary and may be omitted insofar as they would make the characteristics of the invention unclear. It is also to be understood that when any part is referred to as "comprising" or "including" any element, this does not exclude other elements, but may further include other elements unless otherwise stated.

An embodiment of the present invention pertains to a compound for labeling mitochondria, the compound being represented by Chemical Formula 1 below. The compound is responsible for specifically labeling mitochondria, emitting light in the NIR range, and generating red fluorescence.

[Chemical Formula 1]

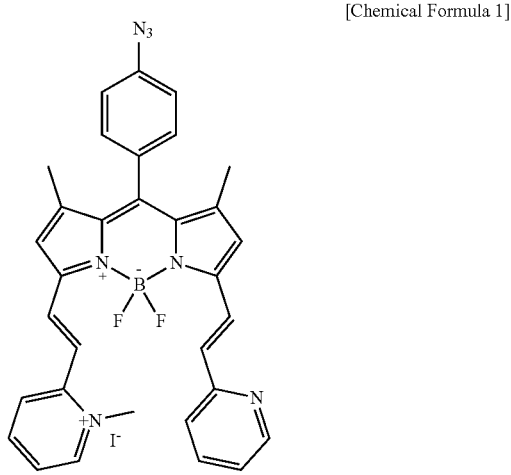

Another embodiment of the present invention pertains to a fluorescent probe for labeling mitochondria, represented by Chemical Formula 1, in which the probe emits light in the NIR range and generates red fluorescence.

Still another embodiment of the present invention pertains to a method of preparing a compound for labeling mitochondria as represented by Chemical Formula 1, the method comprising obtaining a compound represented by Chemical Formula 2, obtaining a compound represented by Chemical Formula 3, obtaining a compound represented by Chemical Formula 4, and obtaining a compound represented by Chemical Formula 1.

The compound represented by Chemical Formula 2 may be obtained in a manner in which, as shown in Scheme 1 below, 2,4-dimethylpyrrole and 4-nitrobenzaldehyde are dissolved in dichloromethane, and the resulting solution is added dropwise with trifluoroacetic acid to check material color changes and reacted, introduced with 2,3-dichloro-5,6-dicyano-1,4-benzoquinone (DDQ) dissolved in dichloromethane and reacted, added with diisopropylethylamine (DIPEA) and reacted, and added with boron trifluoride etherate and reacted, after which the solvent is removed, followed by silica-based normal-phase chromatography, thereby yielding the compound represented by Chemical Formula 2.

[Scheme 1]

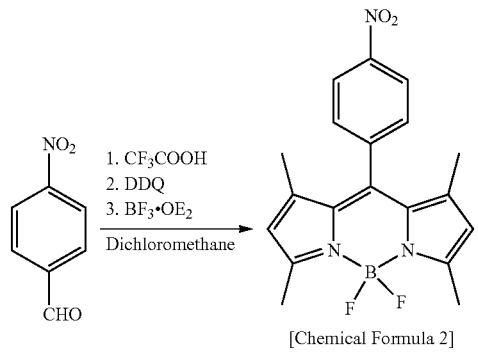

[Chemical Formula 2]

The compound represented by Chemical Formula 3 may be obtained in a manner in which, as shown in Scheme 2 below, the compound represented by Chemical Formula 2, hydrazine and Pd/C are dissolved in ethanol, refluxed and cooled to room temperature, Pd/C is removed through celite, purification is performed through silica-based normal-phase chromatography to give an orange-colored powder, which is then dissolved in a mixed solution of hydrochloric acid and methanol, added dropwise with sodium nitrite dissolved in water and reacted, and introduced with sodium azide dissolved in water and reacted, after which the solvent is removed, followed by purification through silica-based normal-phase chromatography, thereby yielding the compound represented by Chemical Formula 3.

[Scheme 2]

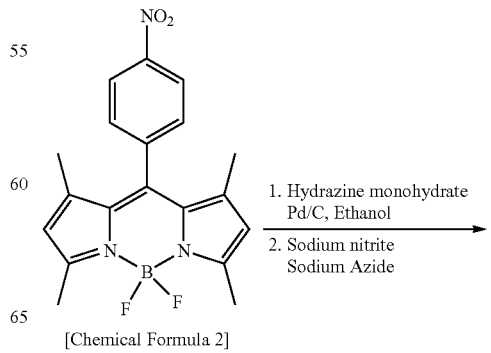

[Chemical Formula 2]

-continued

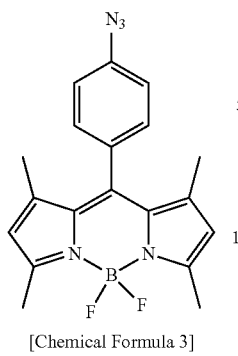

[Chemical Formula 3]

The compound represented by Chemical Formula 4 may be obtained in a manner in which, as shown in Scheme 3 below, the compound represented by Chemical Formula 3, 2-pyridinecarbaldehyde, pyrrolidine and acetic acid are dissolved in acetonitrile (ACN), added with molecular sieves, reacted, filtered to remove the molecular sieves, and diluted with dichloromethane, after which the solvent is removed, followed by silica-based normal-phase chromatography, thereby yielding the compound represented by Chemical Formula 4.

[Scheme 3]

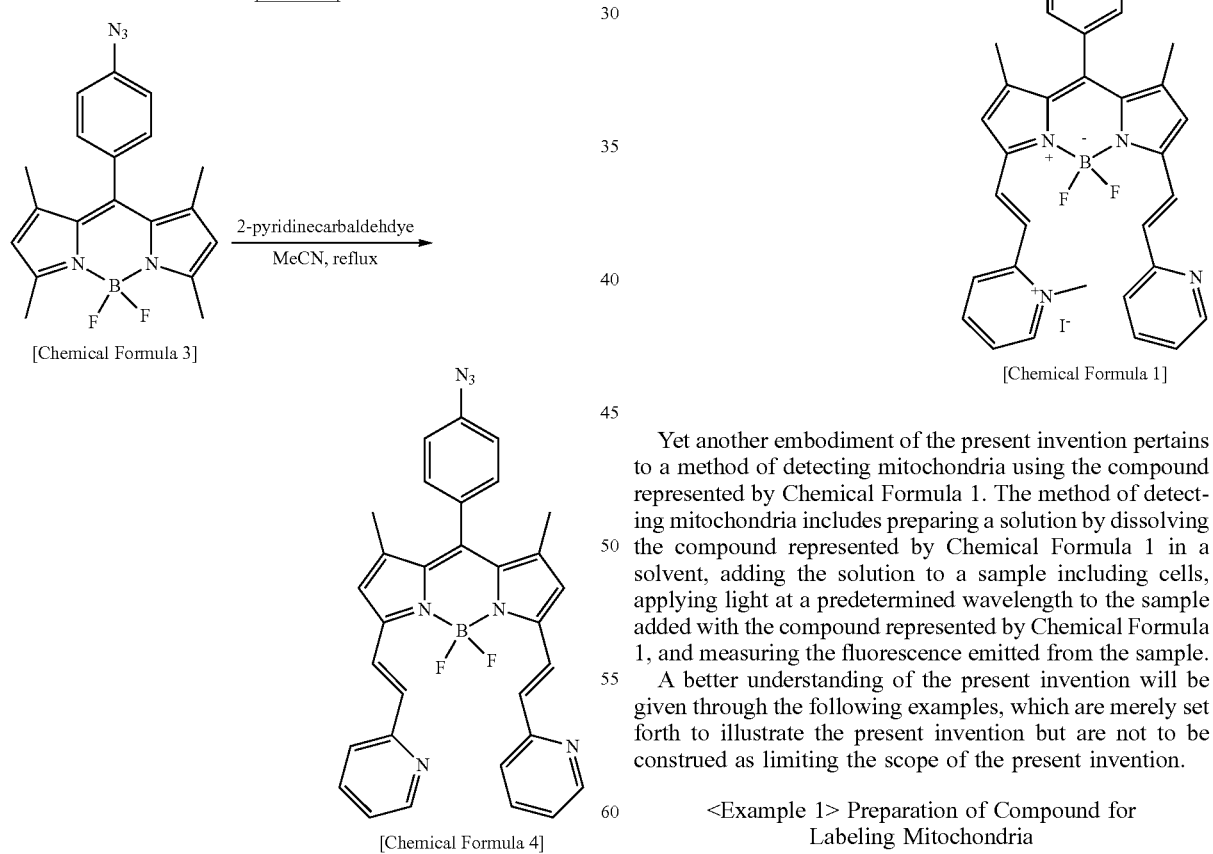

[Chemical Formula 4]

The compound represented by Chemical Formula 1 may be obtained in a manner in which, as shown in Scheme 4 below, the compound represented by Chemical Formula 4 is dissolved in acetonitrile, added with methyl iodide, and refluxed, and the solvent is removed, followed by prep LC, thereby yielding the compound represented by Chemical Formula 1.

[Scheme 4]

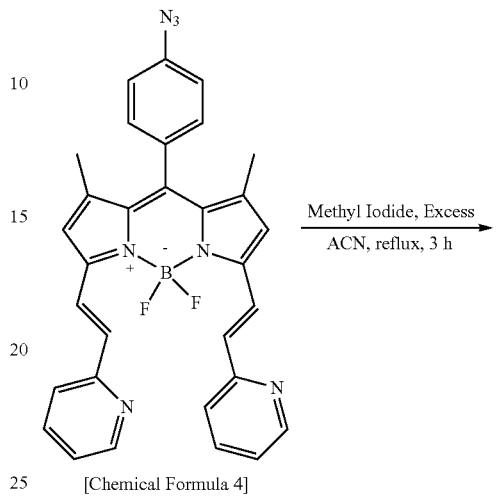

[Chemical Formula 1]

Yet another embodiment of the present invention pertains to a method of detecting mitochondria using the compound represented by Chemical Formula 1. The method of detecting mitochondria includes preparing a solution by dissolving the compound represented by Chemical Formula 1 in a solvent, adding the solution to a sample including cells, applying light at a predetermined wavelength to the sample added with the compound represented by Chemical Formula 1, and measuring the fluorescence emitted from the sample.

A better understanding of the present invention will be given through the following examples, which are merely set forth to illustrate the present invention but are not to be construed as limiting the scope of the present invention.

<Example 1> Preparation of Compound for Labeling Mitochondria 1. 2,4-dimethylpyrrole (2 mmol) and 4-nitrobenzaldehyde (1 mmol) were dissolved in dichloromethane (50 mL) in a nitrogen atmosphere, and the resulting solution was added with one drop of trifluoroacetic acid to check material color changes, reacted overnight in a dark room at room temperature, introduced with 1 mmol of DDQ dissolved in 20 mL of dichloromethane, and reacted for an additional 30 min. Thereafter, the resulting reaction solution was added with 3 mL of DIPEA, reacted for 5 min, further added with 3 mL of boron trifluoride etherate, and further reacted for 3 hr, after which the solvent was removed and silica-based normal-phase chromatography was then performed, thus obtaining the compound represented by Chemical Formula 2.

2. 1 mmol of the compound represented by Chemical Formula 2, 0.2 mL of hydrazine, and 1.3 mmol of 10% Pd/C were dissolved in 4 mL of ethanol, refluxed for 30 min, and cooled to room temperature, after which Pd/C was removed through celite and purification was performed through silica-based normal-phase chromatography to give an orange-colored powder, which was then dissolved in a solution of hydrochloric acid and methanol at 1:1, cooled to 0° C. and treated for 10 min, after which 1.5 mmol of sodium nitrite dissolved in 0.5 mL of water was added dropwise thereto for 5 min, followed by reaction for 1 hr. Thereafter, 3 mmol of sodium azide dissolved in 1 mL of water was added thereto, and the resulting reaction solution was heated to room temperature and further reacted for 1 hr, and the solvent was removed, followed by purification through silica-based normal-phase chromatography, thus obtaining the compound represented by Chemical Formula 3.

3. 1 mmol of the compound represented by Chemical Formula 3, 4 mmol of 2-pyridinecarbaldehyde, 6 mmol of pyrrolidine, and 6 mmol of acetic acid were dissolved in 15 mL of acetonitrile, added with molecular sieves (4 Å, 200 mg), and reacted at 80° C. in a nitrogen atmosphere. When color changes were observed, the reaction was further carried out for 1 hr. Thereafter, the resulting reaction solution was cooled to room temperature, filtered to remove the molecular sieves, and diluted with dichloromethane, and the solvent was removed, and silica-based normal-phase chromatography was then performed, thus obtaining the compound represented by Chemical Formula 4.

4. 50 mg of the compound represented by Chemical Formula 4 was dissolved in 5 mL of acetonitrile, added with methyl iodide (1 mL), and refluxed for 3 hr, and the disappearance of the reactants was observed by TLC, followed by removal of the solvent and prep LC, ultimately yielding the compound represented by Chemical Formula 1 (the results of proton NMR and carbon NMR spectroscopy showed that the above compound was represented by Chemical Formula 1).

<Example 2> Measurement of Absorption and Emission Spectra of Compound Prepared in Example 1

1. The compound represented by Chemical Formula 1 prepared in Example 1 was dispersed in ethanol, and the absorbance spectrum and the emission spectrum thereof were measured using a UV/VIS/NIR spectrometer. The results are shown in FIG. 1(FIG. 1a) shows the resultant absorbance spectrum and FIG. 1b) shows the resultant emission spectrum).

2. As shown in FIG. 1, the compound represented by Chemical Formula 1 had Abs max at 626 nm and Ems max at 665 nm, from which the compound represented by Chemical Formula 1 can be concluded to be useful as an NIR dye.

<Example 3> Confirmation of Labeling of Mitochondria with Compound Prepared in Example 1

Figure 2:
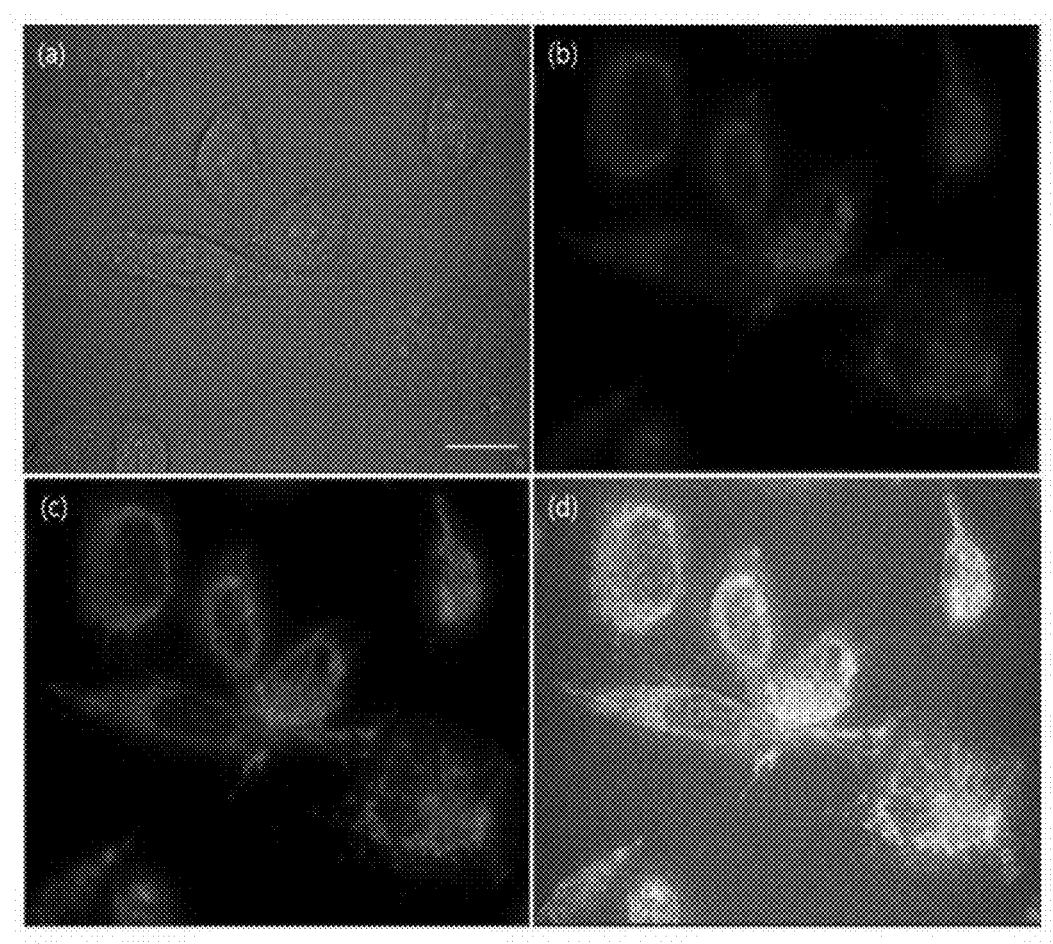
FIG. 2 show fluorescent microscope images for confirming the labeling of mitochondria with the compound according to an embodiment of the present invention.

1. Hela cells were simultaneously treated with the compound represented by Chemical Formula 1, prepared in Example 1, and with mitochondria-tracking MitoTracker Green FM. The fluorescent microscope images thereof are shown in FIG. 2. FIG. 2(a) shows the Bright field, FIG. 2(b) shows the image treated with the compound represented by Chemical Formula 1, FIG. 2(c) shows the image treated with the MitoTracker Green FM, and FIG. 2(d) shows the overlay results. Both the compound represented by Chemical Formula 1 and the MitoTracker Green FM were treated at 200 nM for 1 hr, and a fluorescent microscope DMi 8 from Leica was used. In order to obtain the image of FIG. 2(B), a 546 nm light source and a 585 nm filter were used, and to obtain the image of FIG. 2(C), a 480 nm light source and a 527 nm filter were used.

2. With reference to FIG. 2, the test results (FIG. 2(b)) using the compound represented by Chemical Formula 1 matched the test results (FIG. 2(c)) using the mitochondria-tracking MitoTracker Green FM, from which the compound of the present invention can be concluded to be useful in labeling (imaging) mitochondria.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A compound represented by Chemical Formula 1 below

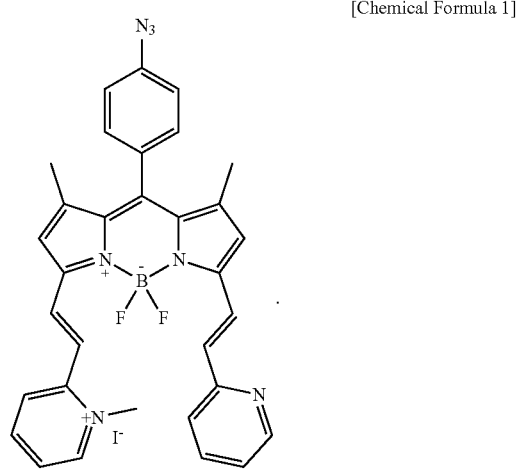

[Chemical Formula 1]

2. A fluorescent probe for labeling mitochondria, represented by Chemical Formula 1 below

[Chemical Formula 1]

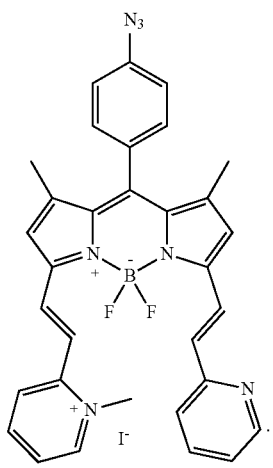

3. A method of detecting mitochondria using the compound represented by Chemical Formula 1 of claim 1, comprising:

preparing a solution by dissolving the compound represented by Chemical Formula 1 in a solvent; and adding the solution to a sample including cells.

4. The method of claim 3, further comprising:

applying light at a predetermined wavelength to the sample added with the compound represented by Chemical Formula 1; and measuring a fluorescence emitted from the sample.

5. A method of preparing a compound for labeling mitochondria, the method comprising forming a compound represented by Chemical Formula 1 below by reacting a compound represented by Chemical Formula 4 below, acetonitrile and methyl iodide,

[Chemical Formula 1]

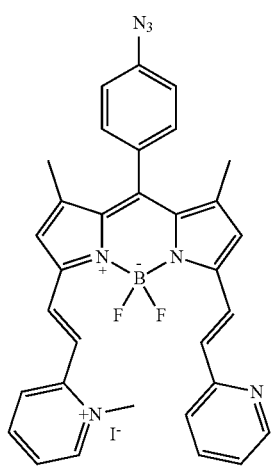

[Chemical Formula 4]

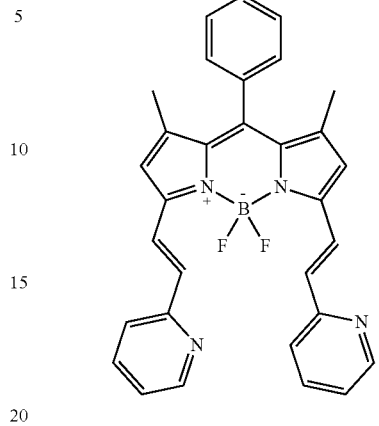

6. The method of claim 5, wherein the compound represented by Chemical Formula 4 is formed by dissolving a compound represented by Chemical Formula 3 below, 2-pyridine carbaldehyde, pyrrolidine and acetic acid in acetonitrile and carrying out a reaction with addition of a molecular sieve,

[Chemical Formula 3]

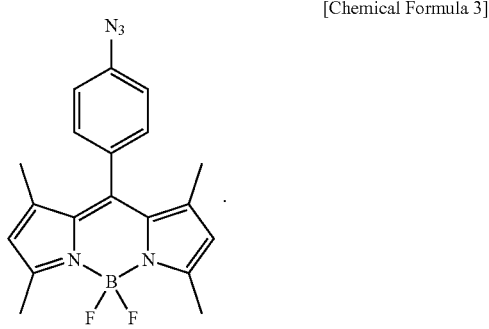

7. The method of claim 6, wherein the compound represented by Chemical Formula 3 is formed by reacting a compound represented by Chemical Formula 2 below, hydrazine and Pd/C in ethanol, removing Pd/C through celite, performing purification to give a powder, dissolving the powder in a mixed solution of hydrochloric acid and methanol, carrying out a reaction with addition of a sodium nitrite solution, and carrying out a reaction with addition of a sodium azide solution,

[Chemical Formula 2]

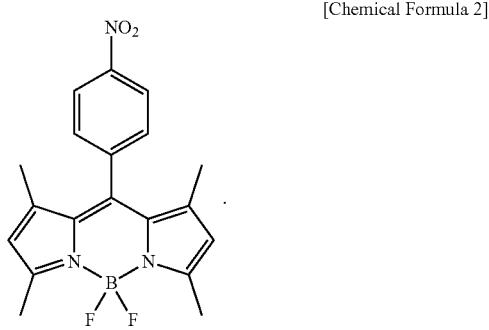

8. The method of claim 7, wherein the compound represented by Chemical Formula 2 is formed by dissolving 2,4-dimethylpyrrole and 4-nitrobenzaldehyde in dichloromethane, carrying out a reaction with addition of trifluoroacetic acid, carrying out a reaction with addition of 2,3-dichloro-5,6-dicyano-1,4-benzoquinone dissolved in dichloromethane, carrying out a reaction with addition of diisopropylethylamine, and carrying out a reaction with addition of boron trifluoride etherate.

* * * * *